United States Patent
Beckman et al.

(10) Patent No.: US 10,800,040 B1
(45) Date of Patent: Oct. 13, 2020

(54) SIMULATION-REAL WORLD FEEDBACK LOOP FOR LEARNING ROBOTIC CONTROL POLICIES

(71) Applicant: Amazon Technologies, Inc., Seattle, WA (US)

(72) Inventors: Brian C. Beckman, Seattle, WA (US); Leonardo Ruggiero Bachega, Seattle, WA (US); Brandon William Porter, Yarrow Point, WA (US); Benjamin Lev Snyder, Seattle, WA (US); Michael Vogelsong, Seattle, WA (US); Corrinne Yu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 15/842,737

(22) Filed: Dec. 14, 2017

(51) Int. Cl.
*B25J 9/16* (2006.01)

(52) U.S. Cl.
CPC .............. *B25J 9/1671* (2013.01); *B25J 9/163* (2013.01); *B25J 9/1605* (2013.01)

(58) Field of Classification Search
CPC ....................................... B25J 9/00; B25J 9/16
See application file for complete search history.

(56) References Cited

U.S. PATENT DOCUMENTS

| | | | |
|---|---|---|---|
| 9,811,074 B1* | 11/2017 | Aichele | ............ B25J 9/1661 |
| 10,105,841 B1 | 10/2018 | Szatmary et al. | |
| 10,445,442 B2 | 10/2019 | English et al. | |
| 10,471,594 B2* | 11/2019 | Bergstra | ............ B25J 9/1656 |
| 2014/0006320 A1 | 1/2014 | Linker et al. | |
| 2015/0094850 A1* | 4/2015 | Passot | ............ B25J 9/163 700/245 |
| 2015/0127155 A1 | 5/2015 | Passot et al. | |
| 2015/0258683 A1 | 9/2015 | Izhikevich et al. | |
| 2016/0059412 A1 | 3/2016 | Oleynik | |
| 2016/0167227 A1 | 6/2016 | Wellman et al. | |
| 2017/0190052 A1 | 7/2017 | Jaekel et al. | |
| 2019/0232489 A1* | 8/2019 | Pascanu | ............ G05B 13/027 |
| 2019/0283247 A1 | 9/2019 | Chang et al. | |
| 2019/0291277 A1 | 9/2019 | Oleynik | |
| 2019/0358810 A1 | 11/2019 | Odhner et al. | |

OTHER PUBLICATIONS

KUKA Robot Group, "KUKA Robot Bottle Flip Challenge—Machine Learning in Practice", as published Apr. 19, 2017, https://web.archive.org/web/20170419163622/www.youtube.com/watch?v=HkCTRcN8TB0, 1 page.

(Continued)

*Primary Examiner* — Kira Nguyen
(74) *Attorney, Agent, or Firm* — Knobbe, Martens, Olson & Bear, LLP

(57) ABSTRACT

A machine learning system builds and uses computer models for controlling robotic performance of a task. Such computer models may be first trained using feedback on computer simulations of the robot performing the task, and then refined using feedback on real-world trials of the robot performing the task. Some examples of the computer models can be trained to automatically evaluate robotic task performance and provide the feedback. This feedback can be used by a machine learning system, for example an evolution strategies system or reinforcement learning system, to generate and refine the controller.

20 Claims, 6 Drawing Sheets

(56) References Cited

OTHER PUBLICATIONS

Abbeel et al., "Apprenticeship Learning via Inverse Reinforcement Learning", Appearing in Proceedings of the 21st International Conference on Machine Learning, Banff, Canada, 2004, pp. 8. Available at http://www.cs.stanford.edu/~pabbeel/irl/.

Abbeel, Pieter, "Apprenticeship Learning and Reinforcement Learning with Application to Robotic Control", Ph.D. Dissertation, Stanford University, Computer Science, Aug. 2008, pp. 248. Available at http://ai.stanford.edu/~pabbeel/thesis/thesis.pdf.

Christiano et al., "Deep Reinforcement Learning from Human Preferences", Jul. 13, 2017, version 3, pp. 17. Available at https://arxiv.org/abs/1706.03741.

Krizhevsky et al., "ImageNet Classification with Deep Convolutional Neural Networks", Part of: Advances in Neural Information Processing Systems 25 (NIPS 2012), pp. 9. Available at https://papers.nips.cc/paper/4824-imagenet-classification-with-deep-convolutional-neural-networks.pdf.

OpenAI, "Learning from Human Preferences", Jun. 13, 2017, pp. 8. Available at https://blog.openai.com/deep-reinforcement-learning-from-human-preferences/.

OpenAI, "Gathering Human Feedback", Aug. 3, 2017, pp. 4. Available at https://blog.openai.com/gathering_human_feedback/.

Salimans et al., "Evolution Strategies as a Scalable Alternative to Reinforcement Learning", Sep. 7, 2017, version 2, pp. 13.

Althoefer et al., "Reinforcement Learning in a Rule-Based Navigator for Robotics Manipulators", Neurocomputing, 2001, vol. 37, pp. 51-70.

Baird III, Leemon C., "Reinforcement Learning Though Gradient Descent", Thesis, School of Computer Science, Carnegie Mellon University, May 14, 1999, pp. 78.

Botterill et al., "Speeded-Up Bag-of-Words Algorithm for Robot Localisation through Scene Recognition", In Proceedings of Image and Vision Computing New Zealand, IEEE 2008, pp. 6.

Hager et al., "Robot Feedback Control Based on Stereo Vision: Towards Calibration-Free Hand-Eye Coordination", IEEE, 1994, pp. 2850-2856.

Kehoe et al., "Cloud-Based Robot Grasping with the Google Object Recognition Engine", 2013 IEEE International Conference on Robotics and Automation (ICRA), Karlsruhe, Germany, May 6-10, 2013, pp. 4263-4270.

LeCun et al., "Convolutional Networks and Applications in Vision", IEEE 2010, pp. 253-256.

\* cited by examiner

SIMULATION-REAL WORLD FEEDBACK LOOP FOR LEARNING ROBOTIC CONTROL POLICIES

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
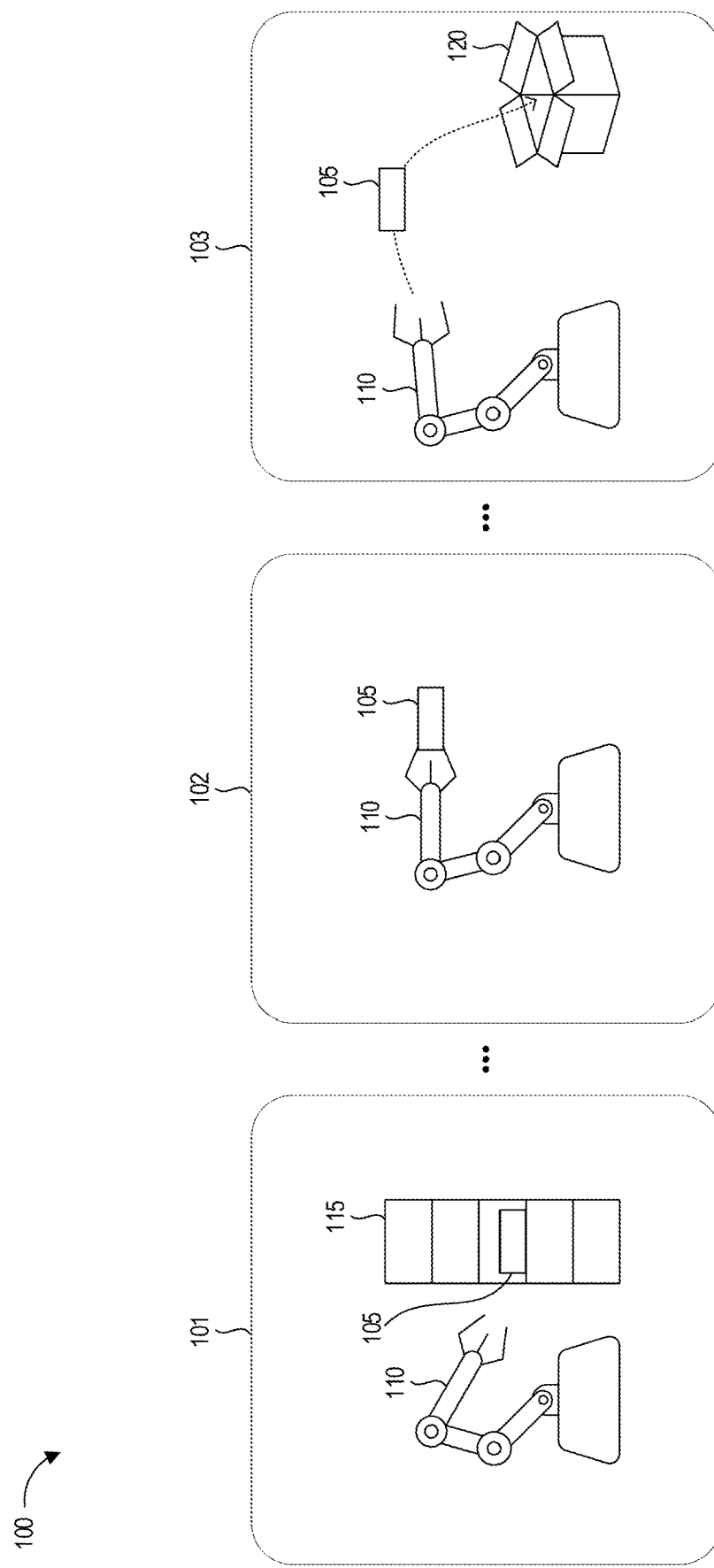
FIG. 1 depicts an illustrative example of a robotic system performing a task.

The present disclosure is generally directed to using artificially intelligent machine learning systems to build and use control policies for robotic systems to perform given tasks. For example, a training system can generate a simulated environment approximating the real-world physical conditions of a robotic system performing a task. The training system can run a number of simulations of the robotic system virtually performing the task in the simulated environment according to a preliminary version of the robotic control policy. These virtual performances can be evaluated to determine how successful they are, and machine learning techniques can leverage the evaluations to iteratively refine the control policy. Once the virtual performances have reached a desired level of success, the control policy can be provided to a controller of the robotic system to begin task performance in the real world. The training can continue to iteratively refine the control policy by evaluating its real-world usage by the robotic system until the real-world robotic success at task performance has reached a desired level.

Most control policies for robotics, including autopilots and self-driving automobiles, are hard-coded around mathematical models of the physical systems being controlled. Robotic systems face many challenges as robotic platforms move from laboratory testing into real world applications. In particular, the huge amount of variety encountered in real-world environments can be extremely challenging for existing robotic control algorithms to handle. Typically, a robotics control engineer or team of such engineers would hand-design control policies for each task the robot is to perform. However, for complex tasks (e.g., autonomous driving or flying) and even some non-complex tasks, it can be challenging to hand-code an entire end-to-end robotic control policy. It can also be challenging to scale these approaches up to the huge amount of variety that robots must deal with in the real world when performing the desired tasks. For example, control policies are limited by the ability of engineers to understand every aspect of the system, task, and environment well enough to model it mathematically. The control policies cannot operate outside the envelope of the control laws written explicitly into them.

The disclosed systems address the aforementioned problems, among others, by the disclosed machine learning techniques for generating robotic control policies. The techniques can begin policy training in a simulated environment and then continue training the policy in a corresponding real world environment. By using machine-learned policies to control robotic task performance, the present technology is able to achieve levels of robustness, accuracy, and flexibility not available by traditional methods. As an example, a machine learned robotic control policy may yield the capability to perform tasks that a human cannot figure out or imagine, for example an autopilot control policy that can recover from stall. Further, for some dangerous tasks, the initial policy training within the simulated environment beneficially avoids the potential damage that could occur from generating a policy from scratch using testing in the real world. For example, if the task is for the robot to move a heavy object, controlling a robot to do so with a randomly-initialized control policy at the outset of training could result in damage to the robot, the object, or the environment due to poor handling of the heavy object.

To illustrate, consider the example presented by FIG. 1. FIG. 1 depicts an example robot 110 performing an example task 100 of picking up an object 105 from a storage structure 115 and tossing the object 105 into a box 120. This involves several steps, shown as approaching the storage structure (step 101), grasping and moving with the object (step 102), and tossing the object into the box (step 103). A control policy for this task 100 would specify the actions required to complete each of these steps. Such an arrangement may, for example, exist in an order fulfillment center in which a robotic system picks up ordered items from storage structures and transfers them to bins or boxes for shipment to customers. Thus, picking up the object 105 represents one task of many potential tasks that the robot 110 may be programmed and configured to perform within such an order fulfillment center.

The robot 110 is guided through the sequence of actions needed to perform the task 100 by its controller. The controller is the hardware that operates to control the robot based on a control policy, for example a control policy learned as described herein. The control policy can be considered as the model or model parameters programmed into the controller, for example as a function that takes in variables representing the current state of the system (the robot, its environment, and any objects) and a specification of the current task, and then outputs a specification of actions the robot should take. Robotic controllers, say for grasping and locomotion, can include action decision making policies, task lists, computer vision, mapping, tracking, and planning.

In order to train the robot 110 to perform the task, the training system (or a control engineer operating the system) can design a simulated environment that approximates the real-world environment. The real-world environment in the example of FIG. 1 includes the robot 110 itself, the object 105, the storage structure 115, the box 120, and any physical conditions of the environment. The simulated environment represents a comprehensive, high-fidelity simulation of the scenarios and tasks involved, including any objects being manipulated, the robot performing the manipulation, the environment in which the objects and robot exist, sensors that furnish inputs (e.g., cameras, microphones, radar, lidar, joint-position sensors, strain gauges, barometers, airspeed sensors, thermometers, and hygrometers), and sensor noise from the environment (e.g., smoke, haze, glare, wind, vibration). The robot kinematics may be known with a high degree of precision from its manufacturing specifications and/or calibration test data, however the physical characteristics of other components of the environment can be unknown, variable, and/or complex.

As such, while maintaining high fidelity to the real world environment, the simulated environment may be physically less complex (e.g., model fewer physical parameters) than the corresponding real world environment. To illustrate, in the real world the target object 105 may have unevenly distributed weight, or may be filled with liquid that moves and changes the weight distribution of the object. There may be air currents that affects the trajectory of the object 105 as it is thrown into the box 120. There may be a complex model of the friction within the box 120. However, the simulated environment can instead model the object as having a static and evenly distributed weight, can model the environment without air currents, and can model the box using a simple friction model (or as just a boundary of the location of the opening into the box). This can make the simulation less computationally expensive to run, and may also provide the benefit of generalizing the control policy to a range of possible physical conditions. Further, this avoids the time and computing resources that may be required to measure a large number of real-world parameters.

During the initial, virtual phase of training, the training system can repeatedly simulate trials of the process 100 within the simulated environment. These virtual performances can be evaluated to determine a level of success of the virtual task performance, for example by an artificial intelligence component of the training system or by a human evaluator. Using this evaluation, the training system can implement machine learning to develop the policy, for example by modifying the policy to yield increasingly successful virtual performances. In various embodiments, the training system can implement reinforcement learning or evolution strategies to incrementally develop the input and output laws of the policy by exposure to the virtual training scenarios and corresponding evaluation feedback.

The virtual phase of training can involve twenty to thirty virtual performance trials in some examples before the policy is ready for testing in the real world. Other examples may use greater or fewer numbers of trials, as needed to achieve the desired metric of virtual success using the policy. This desired metric can be the robotic system consistently achieving the desired task objective, for example by repeating success for a certain number of trials. At this point, the training process can transition from the virtual phase into a real-world refinement phase by providing the control policy to the controller to the robot 110 operating in the real-world environment that corresponds to the simulated environment.

The robot 110 can begin to iterate through a number of real-world trial runs of the task 100 using the virtually-generated control policy. The performance of the robot 110 can be observed (by a human or by an observation recording system) and then evaluated (by the human or a machine learning classifier) to gauge how successful the virtually-generated control policy is in guiding real-world task performance. Using this evaluation, the training system can continue to implement machine learning to refine the control policy to yield increasingly successful virtual performances.

The real-world refinement phase can involve ten to fifteen fine tuning trials in some examples before the control policy is ready for use in a hardware controller guiding robotic task performance. Other examples may use greater or fewer numbers of trials, as needed to achieve the desired metric of real-world success using the control policy. After completion of this training process, the controller programmed with the control policy and the robot can be deployed for task performance within the designated environment. New scenarios may lead to additional training of the control policy in a recalibration process using similar training techniques.

The performance of these machine learned control policies for given tasks may surpass their traditional, hand-coded competitors in terms of flexibility, accuracy, and cost. Regarding flexibility, the control policies may be more robust to the number of unanticipated situations they can handle, for example by enabling robotic graspers to pick up objects that they were not trained to pick up and enabling robotic autopilots to respond safely to situations that they did not see in training. Regarding accuracy, the accuracy of a machine learned neural network system is primarily limited by the number of layers in the neural network, and the accuracy of an evolutionary strategy system is primarily limited by the number of nodes in its program, rather than by numerical or storage limits of equation solvers used in traditional controllers. Regarding cost, training a machine learned control policy can be far less expensive than developing and certifying the mathematical models and code required for a traditional control policy.

FIG. 1 represents picking up and throwing an object as one example of a robotically-performed task for which a control policy can be generated using machine learning techniques as described herein. This example is provided to illustrate and not limit the disclosed machine learning techniques. Other example real-world tasks include SLAM (simultaneous location and mapping), transferring objects to and from storage structures, stowing objects in semi-rigid or soft containers, moving objects onto conveyor belts, item manipulation, autonomous movement through static or dynamic environments such as warehouses, autonomous flying, autonomous driving of an automobile, lifting objects, forklift manipulation, tractor-trailer attach and detach, shunting yard control (e.g., assembling trains, packing cargo containers), and flipping a bottle. As another example, the disclosed techniques can be used to generate control policies for robots that perform, or assist in the performance of, surgical procedures. In some implementations, the disclosed techniques may be particularly useful for generating control policies for tasks that humans find difficult, as the control policies for such tasks may be particularly challenging to write by hand.

Although aspects of some embodiments described in the disclosure will focus, for the purpose of illustration, on particular examples of training data, tasks, and robotic systems, the examples are illustrative only and are not intended to be limiting. In some embodiments, the techniques described herein may be applied to additional or alternative training data, robotic systems, and tasks. Various aspects of the disclosure will now be described with regard to certain examples and embodiments, which are intended to illustrate but not limit the disclosure.

Overview of Example Machine Learning Techniques

Figure 2A:
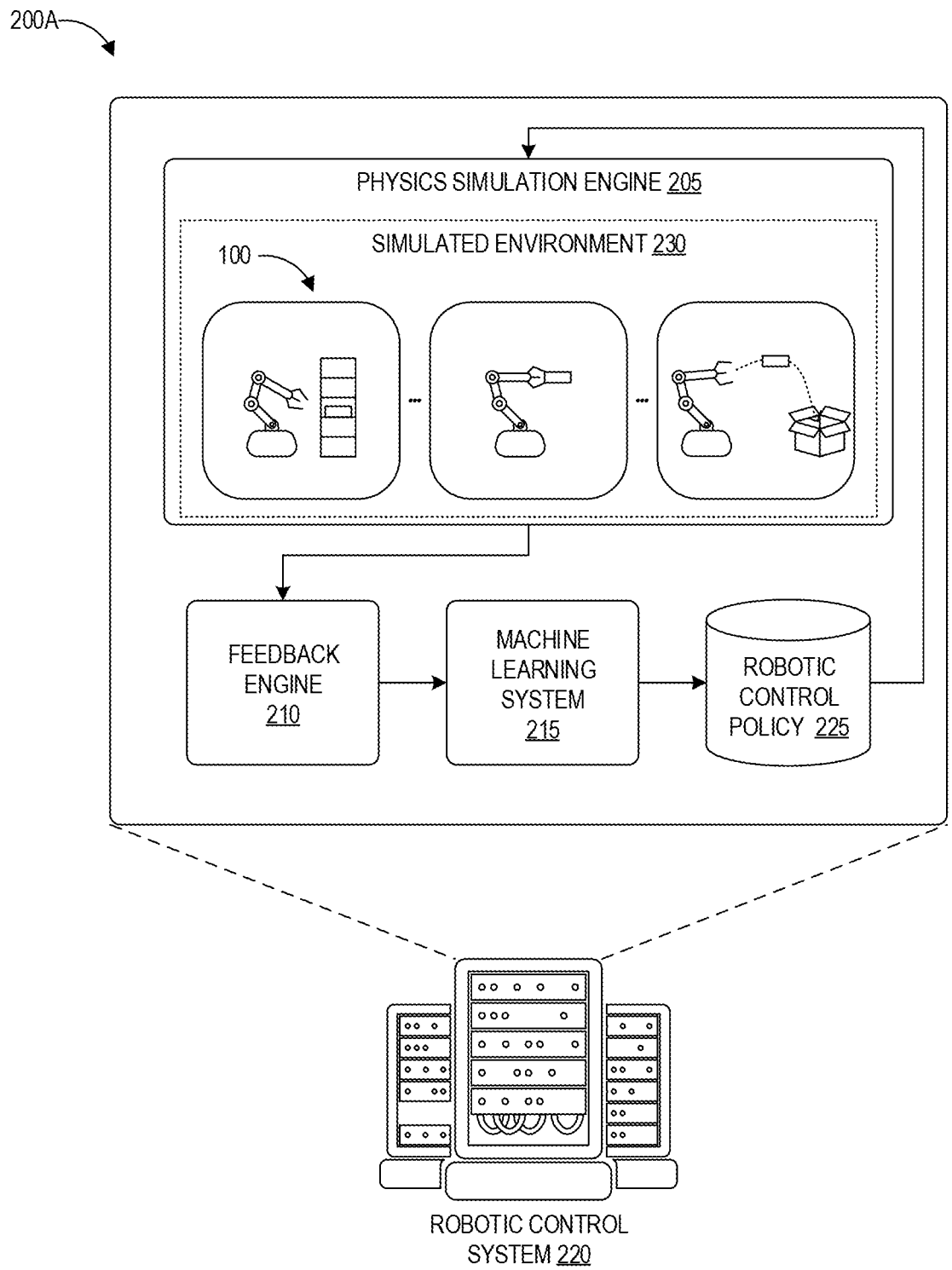
FIGS. 2A and 2B depict graphical representations of an example artificial intelligence process for training a control policy to enable a robotic system to perform a task.
Figure 2B:
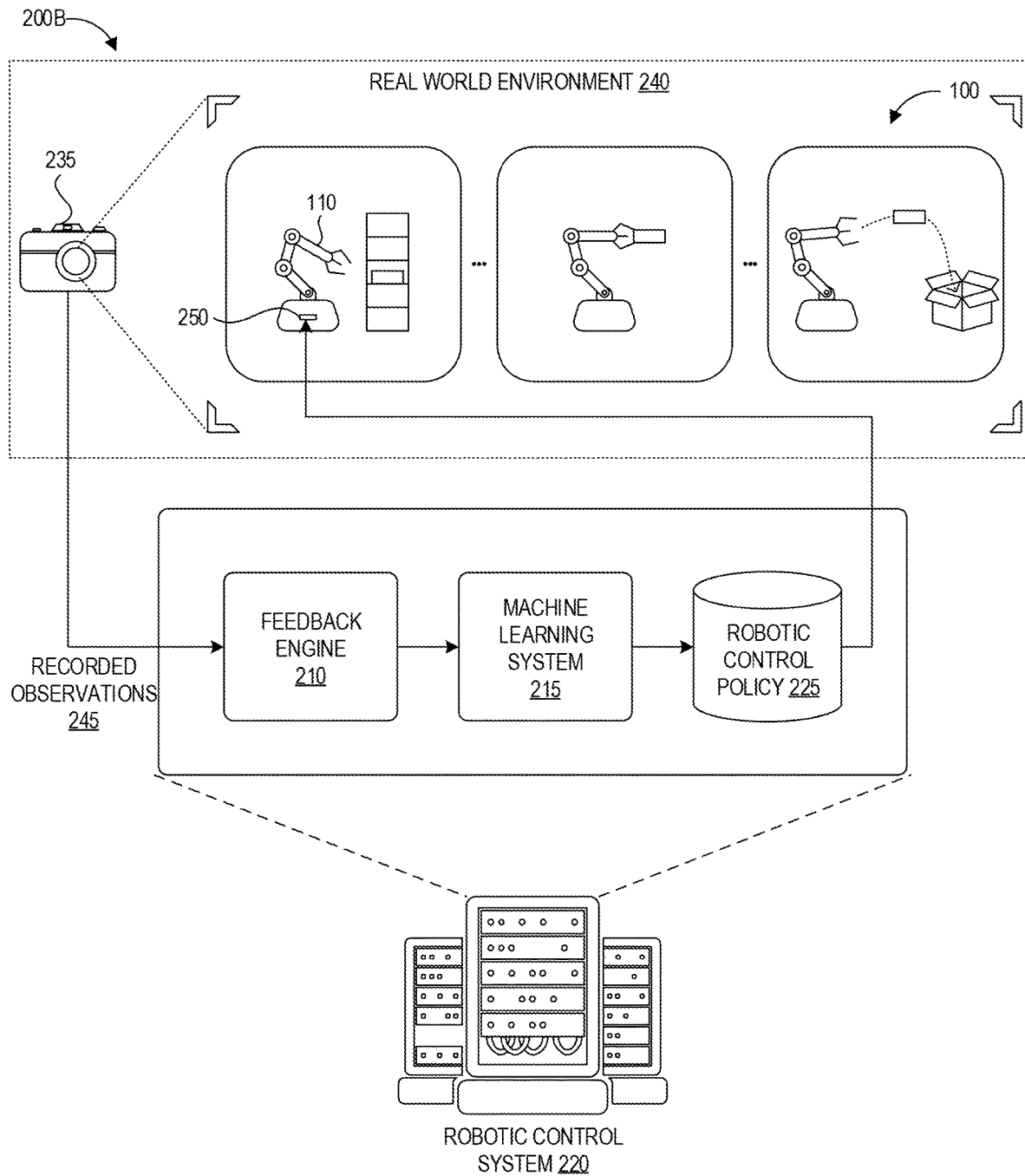

FIGS. 2A and 2B depict graphical representations of an example artificial intelligence technique for training a control policy to enable a robotic system to perform a task. FIG. 2A depicts a graphical representation of a virtual phase 200A of the training technique as implemented by a robotic control system 220 including a physics simulation engine 205, feedback engine 210, machine learning system 215, and control policy 225. The virtual phase 200A of the training technique involves physics simulation engine 205 running simulations of the robotic system performing the task 100 in a simulated environment 230. Recordings of these performances are provided to the feedback engine 210, which generates success/reward scores or outputs comparison preferences indicating which of a number of performances was more successful. This can involve human judgment or can be automated as described further below. The evaluation from the feedback engine 210 guides the machine learning system 215 to generate and refine a robotic control policy for the task. The robotic control policy 225 is stored and then used during the next simulation of the task 100 in the simulated environment 230. The robotic control system 220 can repeat this loop until the robotic control policy 225 achieves the desired performance level within the simulated environment 230.

FIG. 2B depicts a graphical representation of a real-world refinement phase 200B of the training technique as implemented by the robotic control system 220 operating together with the robotic system 110 and an observation system 235 in the real-world environment 240. After completion of the virtual phase 200A of the training technique as shown in FIG. 2A, the robotic control system 220 provides the robotic control policy 225 to the controller 250 of the robotic system 110 to control the robotic system 110 while performing trials of the task 100 in the real world environment 240. The controller 250 is illustrated schematically in FIG. 2B. Controller 250 includes one or more physical data storage devices that store the control policy, data representing task specifications, and other executable instructions for controlling the robotic system 110. As well, the controller 250 includes one or more processors programmed by the instructions to implement robotic control. The controller 250 can receive data from the robot's sensors and can use this data in conjunction with the control policy to determine the sequence of actions taken by the robotic system 110.

The robotic system 110 can be observed in some embodiments by the observation system 235, which provides its recorded observations to the feedback engine 210. In some embodiments a human engineer can directly observe the robotic system 110 and input evaluations into a user interface of the feedback engine 210, and thus the observation system 235 may be omitted. These evaluations by the feedback engine 210 are used by the machine learning system 215 to refine the robotic controller that was previously trained in the simulated environment 230.

Although FIG. 2B does not illustrate the physics simulation engine 205 for purposes of simplicity of FIG. 2B, it will be appreciated that the robotic control system 220 may still include this component during execution of the real-world refinement phase 200B. Further, in some embodiments the robotic control system 220 may return to the virtual phase 200A after commencing the real-world refinement phase 200B, for example to refine the control policy in the simulated environment 230 using updated physical parameters before again returning to the real-world refinement phase 200B. The components of the robotic control system 220 of FIGS. 2A and 2B are described together in further detail below.

During control policy generation, the robotic control system 220 can operate as the machine learning training system that generates the robotic control policy. During both real-world training and implementation, the controller 250 can provide programmatic control of the robotic system 110, for example by maintaining robotic position data, determining a sequence of actions needed to perform tasks based on a current iteration of the control policy, and causing actuation of the various components of the robotic system 110. The robotic control system 220 is illustrated graphically as a server system, and the server system can be configured to control (via a network) a number of remote robotic systems that are the same or different from one another that are performing the same task or different tasks. In other embodiments, the robotic control system 220 can instead be integrated into the robotic system 110. As such, the robotic control system 220 may include one or more computers, perhaps arranged in a cluster of servers or as a server farm. The memory and processors that make up these computers may be located within one computer or distributed throughout many computers (including computers that are remote from one another) as detailed herein. These servers may be configured to generate and implement robotic control policies.

As shown in FIG. 2A, the virtual phase 200A of the training technique involves physics simulation engine 205 running simulations of the robotic system performing the task 100 in a simulated environment 230. As described above, the simulated environment 230 is designed to have a high fidelity to the real-world environment 240, that is, to closely match the configuration and physical parameters of the environment and the objects within it (including the robotic system). However, the simulated environment 230 may be a simplified version of the real-world environment 240 in that it models fewer physical parameters, for example the dynamics of liquid inside objects manipulated by the robot or complex friction models for surfaces in the environment.

Prior to initiation of training, the physics simulation engine 205 defines the parameters and objects of the simulated environment 230. This can be done programmatically, via a user manually setting up the simulated environment 230, or a combination. The physics simulation engine 205 can be configured to output a visual representation of task simulations to a user interface of a display. This can be used together with the feedback engine 210 to elicit user feedback on the success of virtual task performances. The physics simulation engine 205 can be additionally or alternatively configured to record events occurring within the simulated environment 230 and send this data to the feedback engine 210, where it may be programmatically evaluated by a machine learning classifier as described herein.

The feedback engine 210 can be configured in some implementations to elicit or receive feedback from a human observer on virtual or real-world performance trials, for example by outputting a suitable user interface and identifying feedback provided through the interface. This feedback may be an "A/B comparison" preference where the human indicates which of two performances of the task was more successful. Alternatively, the feedback can be a performance score, a binary "succeeded/failed" indication, or other appropriate metrics for indicating the level of success of a particular task performance.

In some implementations, the feedback engine 210 can be a machine learning classifier trained to programmatically evaluate the level of task success represented in a particular virtual trial representation or recorded observation provided to the classifier. Suitable examples include artificial neural networks (including deep neural networks, convolutional neural networks, and recurrent neural networks), capsule networks, Generative Adversarial Networks (GANs), decision trees, random forests, support vector machines, and logistic regression, depending upon the nature of the particular task. Such machine learning classifiers can be trained using supervised training (e.g., provided with labeled data of task performance examples that are successful, not successful, or on a spectrum between successful and not successful) or unsupervised training (e.g., clustering based methods for identifying, from a corpus of recorded observations, task performance examples that are successful, not successful, or on a spectrum between successful and not successful). The machine learning classifier can operate directly on recorded observation data (e.g., pixel values in images or videos of task performance) or utilize vector representations of the recorded observation data. The machine learning classifier can generate scores representing the level of success of the task, can generate a binary indication representing task success or failure, or can output comparison preferences for comparing two or more recorded observations of task performance.

Some embodiments of the machine learning system 215 can implement reinforcement learning to train a control policy expressed, for example, as a Markov decision process (MDP). MDPs model state-transition probabilities; for example a MDP=(S, A, P, R) represents a set of states S, a set of actions A, the expected immediate rewards R received at the transition from state to state by executing an action from the set of actions A, and transition probabilities P. The probability that in a first state a particular action takes the robotic system 110 to a second state can be learned by the machine learning system 215 based on received rewards. The policy $\pi:S \rightarrow A$ is a mapping from the set of states to the set of actions. The goal of the machine learning system 215 can be to maximize the accumulated reward over time (e.g., over the course of a performance of the task) based on using reinforcement learning to learn the state transition probabilities that produce the optimal policy.

Reinforcement learning is an area of machine learning that seeks to learn how to make decisions in order to maximize rewards or minimize costs over a period of time. A reinforcement learning system can be used to model the reward function of the task, which can be considered as a model of the goal of the tasks and may be expressed as weighted factors that influence success at task performance. In other examples this may be written by a human who has familiarity with the task and has analyzed the task to determine what factors contribute to success at performance of the task. However, for complex tasks (e.g., autonomous driving or flying) and even some non-complex tasks, it may not be clear to the human programmer how to construct a suitable reward function, which will need to be a function of the robot's sensors. The difficulty of manually specifying a reward function represents a barrier to applying reinforcement learning to such tasks, and therefore the ability of the machine learning system 215 to generate this reward function can enable the learning of control policies for more complex tasks. To generate the policy, the robotic system takes actions to attempt to perform the task, and then a value called a "reward" is provided to the reinforcement learning system according to the reward function. This reward indicates the quality of task performance but does not tell the reinforcement learning system what the correct decisions or actions would have been. Through exploration (e.g., searching for new options) and exploitation (e.g., refining existing options that have resulted in desired rewards), the reinforcement learning system can learn the control policy that maximizes the accumulated sum of rewards over time.

Alternative embodiments of the machine learning system 215 can use black-box optimization techniques such as evolution strategies to train control policies. Evolution strategies is an optimization technique that uses mutation and selection to guide machine learning. At every iteration ("generation"), a population of parameter vectors is perturbed ("mutated") and their objective function value ("fitness") is evaluated. The highest scoring parameter vectors are then recombined to form the population for the next generation, and this procedure is iterated until the objective is fully optimized. Various suitable evolution strategies algorithms can differ in how they represent the population and how they perform mutation and recombination. Beneficially, evolution strategies can be simpler to implement than some other types of machine learning as there is no need for backpropagation, it can be easier to scale in a distributed setting, and has fewer hyperparameters, and in comparison to reinforcement learning it does not suffer in settings with sparse rewards.

In some embodiments, the machine learning system 215 can use evolution strategies to train a control policy expressed as an L-systems or S-expressions for abstract syntax trees. An L-system includes an alphabet of symbols that can be used to make strings, a collection of production rules that expand each symbol into some larger string of symbols, a string of symbols defining the initial state of the system (referred to as an axiom), and a mechanism for translating the generated strings into robotic actions or configurations. As a simple example, the symbols may control the length of straightforward movement of the robot, the direction of the movement, and the angle of turns. S-expressions are a notation for nested list (tree-structured) data. Evolution strategies can be used to evolve programs expressed as L-systems and S-expressions to achieve the desired robotic action for successfully performing a task. For example, with L-systems recombination can create diversity in an evolved population by combining program parts from two individuals in a generation.

In some embodiments, the machine learning system 215 can use evolution strategies to train an artificial neural network control policy. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learnt from data during the training process, for example through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

With respect to control policies, the neural network can receive input of a number of environmental and task-related parameters including an identification of the desired task to be performed, data from the robot's sensors, and robotic position data, to name a few examples. The neural network can be trained to generate an output based on these inputs, with the output representing an action or sequence of actions that the robot should take to accomplish its objective. For example, particular actions may be mapped to particular ones of the output nodes. In use, the selection of an action can occur by processing the inputs through the parameters of the neural network to generate a value at the output node designating that action as the desired action. This action may then be translated into a machine-readable instruction language that causes the robot to perform the action.

Rather than using backpropagation, the machine learning system 215 can use evolution strategies techniques to tune the parameters of the artificial neural network. This technique is sometimes referred to as "neuro-evolution." Beneficially, this enables the machine learning system 215 to use neural network architectures with functions that may not always be solvable using backpropagation, for example functions that are non-convex. To illustrate, consider an artificial neural network having a set of parameters representing the weights of its node connections. In one example, the machine learning system 215 can make a number of copies of this network and then make different random adjustments to the parameters. This process is referred to as "mutation," and may involve adding a normally distributed random value to each vector component. For instance, the machine learning system 215 may make five copies and adjust the parameters of each differently such that it generates five different modified copies of the original network. In some implementations, portions from various copies in a generation can be combined to form the next generation. The machine learning system 215 can test these networks, evaluate their performance using a predefined success metric, and then select the copy (or original network) that performs best. This can in turn be copied, those copies can be randomly adjusted, and the process can continue until the desired performance has been reached.

As such, the machine learning system 215 can include an artificial neural network, a mutation module, an evaluation module, and a selection module. The evaluation module may implement a reward function similar to that of reinforcement learning in order to generate a reward score for each mutation of a policy.

The robotic control policy data repository 225 stores the various iterations of the control policy. For example, the data repository can store simulated control policies during the virtual phase 200A and can store refined policies during the real-world refinement phase 200B. When the machine learning system 215 uses evolution strategies, the robotic control policy data repository 225 stores the various control policies within a generation, and may store data regarding previous generations. Some examples of the control policies stored in the data repository 225 can be expressed as L-systems and as S-expressions. The control policy includes parameters that dictate, given certain inputs (e.g., a designation of the task to be performed and/or data from sensors, including the robot's sensors), what action or sequence of actions the robotic system 110 should take. These parameters can be learned by the machine learning system 215 as described herein.

The robotic system 110 can be a robot having a number of linkages coupled by a number of joints (motorized or passive) and one or more end effectors configured to interact with the robot's environment. Another example of a robot can include mechanisms for moving the robot about its environment, for example wheels or legs driven by computer-controlled motors, pneumatic systems, or jet propulsion systems (e.g., for aerial robots). The robotic system 210 can also include one or more sensors configured to perceive its environment, for example sensors suitable for perceiving visual, audible, or other sensory parameters of the environment, or for example sensors suitable for perceiving electromagnetic signals emitted from objects within the environment. The structure and sensors of the robotic system 210 can be selected or designed for performance of a particular task or set of tasks, for example warehouse inventory management, aerial package delivery, or surgical procedures, to name a few examples.

The observation system 235 includes one or more sensors positioned and configured to observe the robotic system 110 as it performs its tasks in the real-world environment 240. Suitable sensors include image sensors (e.g., cameras), microphones, and electromagnetic position sensors, to name a few examples. The observation system 235 can generate still images, videos, audio recordings, and/or positional tracking data representing the robotic system 110 performing a task (or representing the target objects of the task). The observation system 235 may be integrated into the robotic system 110, may be a separate structure that is mobile and configured follow the robotic system 110 as it moves about its environment, and/or may include one or more stationary sensors.

The observation system 235 is graphically depicted as a camera, however other systems suitable for recording the desired observations can be used in other implementations. Recorded observations can include audio signals, still images, video images sequences, electromagnetic tracking data, and textual information, depending upon the nature of a particular task. Recorded observations can additionally or alternatively include data from sensors on the robot or the target object of the task, for example data from strain gauges, torque sensors (e.g., back EMF sensors), inertial sensors (e.g., gyroscopes, accelerometers), optical sensors, radio frequency sensors, magnetic wave detectors, haptic sensors, air pressure sensors, and piezoelectric sensors.

Overview of Example Machine Learning Processes

Figure 3:
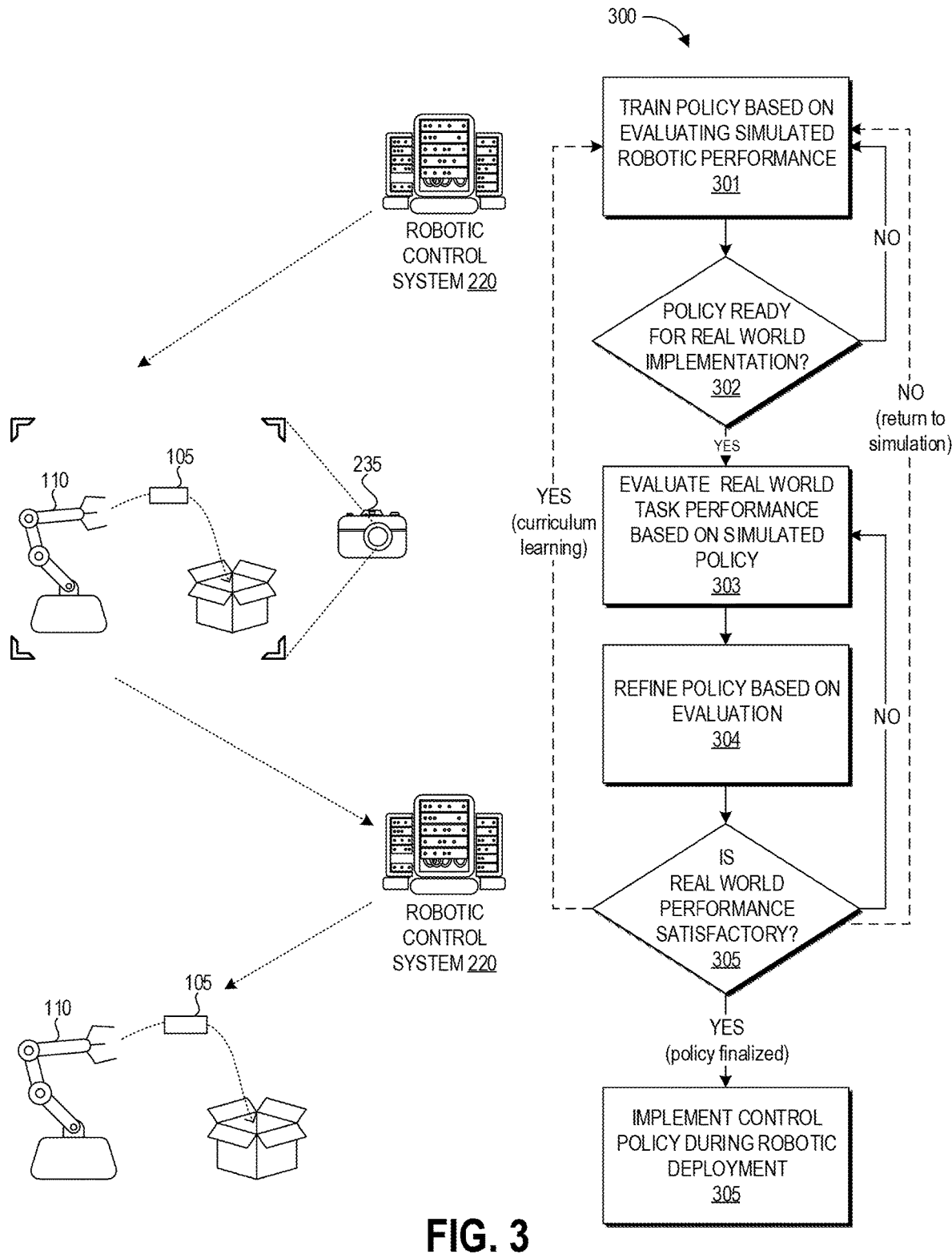
FIG. 3 is a flow diagram of an illustrative artificial intelligence process for generating a robotic control policy according to some embodiments.

FIG. 3 is a flow diagram of an illustrative process 300 for robotic control policy generation using the robotic control system 220 of FIGS. 2A-2B or another suitable system according to some embodiments. Though particular blocks are described with respect to particular components of the robotic control system 220, it will be appreciated that the described functions could be performed in alternate embodiments by other suitable modules or components of the robotic control system 220.

The process 300 may begin in response to an event, such as on a predetermined or dynamically determined schedule, on demand when initiated by a system administer, or in response to some other event. For example, the process 300 may be initiated upon acquisition of a predetermined amount of training data, addition of a new robot and/or task to the robotic control system 220, or a change in a robot or task. When the process 300 is initiated, a set of executable program instructions stored on one or more non-transitory computer-readable media (e.g., hard drive, flash memory, removable media, etc.) may be loaded into memory (e.g., random access memory or "RAM") of a server or other computing device of the robotic control system 220. The executable instructions may then be executed by a hardware-based computer processor (e.g., a central processing unit or "CPU") of the computing device. In some embodiments, the process 300 or portions thereof may be implemented on multiple computing devices and/or multiple processors, serially or in parallel.

At block 301, the robotic control system 220 trains the control policy based on evaluating simulated robotic performance of the task. As described above, this can involve the physics simulation engine 205 generating a simulated environment 230 that is a high-fidelity (though perhaps more simplified in terms of how certain parameters are modeled) copy of the real-world environment and system of the robotic task performance, and then running a number of trials of the robotic system 110 performing the task 100 within the simulated environment 230. Evaluations of each trial from the feedback engine 210, via a human evaluator and/or via a computerized reward function or machine learning classifier evaluation, can guide the machine learning system 215 to generate and iterate a simulated control policy, for example using evolution strategies or reinforcement learning.

At block 302, the robotic control system 220 determines whether the control policy is ready for real world implementation. For example, the robotic control system 220 can determine that the control policy is ready for real world deployment when the policy allows the simulation to achieve its objective (e.g., success at throwing the object 105 into the box 120). As another example, the robotic control system 220 can determine that the control policy is ready for real world implementation when the policy allows the simulation to achieve higher than a threshold score in a simulation of the task 100, either once or a certain number of times. As another example, the robotic control system 220 can determine that the control policy is ready for real world implementation when the policy allows the simulation to achieve consistency of scores across a number of successive simulations of the task 100, for example by the scores being above a "ready" score threshold and varying relative to one another less than a variance threshold. If the answer is no, the robotic control system 220 loops back to block 301 to continue the virtual phase 200A of the control policy training.

If the answer at block 302 is yes, the robotic control system 220 transitions to block 303 to evaluate real-world task performance by the robotic system 110 based on the simulated policy. For example, the robotic control system 220 uses the simulated policy to control the robotic system 110 to perform the task in the real-world environment 240 analog of the simulated environment 230. This performance is evaluated, either by a human or a programmatic module of the feedback engine 210, to indicate its level of success. Block 302 can involve acquiring recorded observations of the robotic task performance from the observation system 235 for automated evaluation.

At block 304, the machine learning system 215 refines the policy based on the evaluation of the real world performance, for example using evolution strategies or reinforcement learning as described above.

At block 305, the robotic control system 220 determines whether the control policy as used in the real world yields satisfactory performance of the task 100. This can involve determining that the robot successfully completed the task, or similar determinations to those discussed with respect to block 302 regarding threshold performance levels. Block 305 can also entail ensuring that the performance of the robotic system 110 complies with any safety regulations or standards. Block 305 can also involve analysis of the condition of any objects with which the robot interacts and a determination that the robot has handled the objects in a manner that leaves them in good condition. If the answer is no, the robotic control system 220 loops back to block 303 to continue the real-world refinement phase 200B of the control policy training.

If the answer at block 305 is yes, the robotic control system 220 transitions to block 306 to implement the control policy during robotic deployment. For example, the robotic system 110 can be provided with the finalized control policy and can use this to perform the task as specified. In some embodiments, the robotic control system 220 can continue to communicate with the robotic system 110 to provide updates to the control policy as required to keep the robotic system performance in line with performance goals.

FIG. 3 also illustrates two optional (dashed) loops through the process 300 from block 305. These loops form a feedback loop from the real world trials back into the simulated trials.

Under certain conditions, the process 300 may follow the dashed "NO" arrow shown in FIG. 3 instead of the solid "NO" arrow. For example, the robotic control system 220 can determine the policy is clearly unsuitable for the real world performance (e.g., a real-world trial runs very differently from the simulations), or can determine that the answer to block 305 has been "no" too many times (e.g., a threshold number of loops through blocks 303-305 have not successfully refined the policy). This causes the robotic control system 220 to return the simulation-based policy training at block 301. In some embodiments, this can involve determining to modify parameters of the simulated environment, as the training in the previous version of the simulated environment did not create a suitable "rough draft" of a real-world policy.

Under these conditions, process 300 can loop back to block 301. The robotic control system 220 and/or human operator can reformulate some of the parameters of the simulated environment, for example by system identification in which real-world parameters are measured and/or dynamics are learned. System identification is a methodology for building mathematical models of dynamic systems from measured data. To illustrate, initially the simulated environment may model only the size and shape of the object 105. For certain objects, such as sledgehammers and other objects having uneven size to mass distributions, this may not produce a policy that enables the real robotic system to actually throw the object as intended. As such, a weight distribution in the object 105 can be measured and this weight distribution used to model the object 105 in the revised simulated environment. The robotic control system 220 can run additional simulations in the revised simulated environment and use evaluations of these simulations to refine the policy and/or build a new policy at block 301.

The other loop back into the simulated environment relates to curriculum learning. In curriculum learning, the goal can be to design a set of policies that cooperate to enable the robotic system to perform multiple actions that are needed for performing different portions of the task. For example, the robotic system can perform a sequence of actions to perform the task 100. The actions in the sequence can include (1) grasping the object 105, and (2) throwing the object 105 into the box 120. Without action (1), the robot cannot perform action (2), and thus the portion of the task relating to action (2) can be considered as building on the portion of the task relating to action (1). Other tasks can involve greater numbers of actions/task portions that build off of one another in various ways.

This action sequence data can be generated and/or accessed by the robotic control system 220 during the training process 300. Based on this sequence data, the robotic control system 220 can determine to begin by training a first policy that will control the robot 110 to perform a first portion of the task (e.g., action (1) to grasp the object).

At block 305, when the robotic control system 220 determines that the real-world performance of grasping the object is satisfactory, the robotic control system 220 can determine to loop back to block 301 along the dashed "YES" arrow to begin training the policy for the next portion of the task (e.g., the policy for action (2) to throw the object). During these additional simulations, the trained first policy is used in the simulated environment to control the robot to grasp the object, and the second policy is trained. Similarly, when the second policy is refined based on real-world trials at blocks 303-304, the first policy controls the robot to perform the first portion of the task while the iteratively refined second policy controls the robot to perform the second portion of the task. In this manner, the complete set of policies that guide the robot to perform the task are sequentially trained based on which policies build off of other policies.

Overview of Example Machine Learning System

Figure 4:
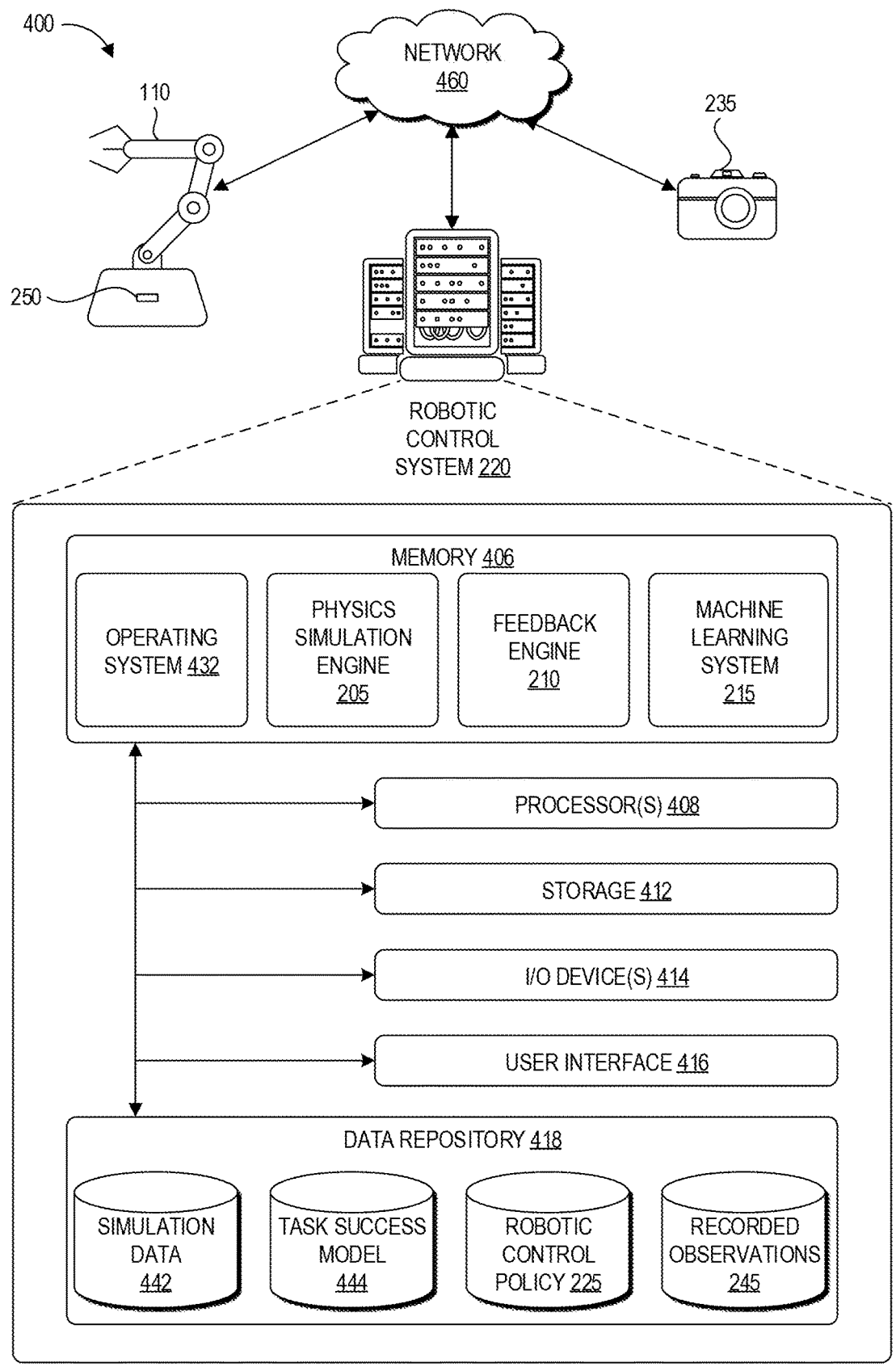
FIG. 4 is a block diagram of an illustrative computing system configured to implement a machine learning system for robotic control using the processes of FIGS. 2A, 2B, and 3.

FIG. 4 is a block diagram of an illustrative computing system 400 configured to implement a machine learning system for robotic control using the processes of FIGS. 2A, 2B, and 3. As illustrated, the computing system 400 includes the robotic system 110, the observation system 235, and the robotic control system 220 configured to communicate data with one another via network 460. Some aspects of the robotic system 110, observation system 235, and robotic control system 220 are discussed above.

The robotic control system 220 includes at least one memory 406 and one or more processing units (or processor(s)) 408. The memory 406 may include more than one memory and may be distributed throughout the robotic control system 220. The memory 406 may store program instructions that are loadable and executable on the processor(s) 408 as well as data generated during the execution of these programs. Depending on the configuration and type of memory, the memory 406 may be volatile (such as random access memory (RAM)) and/or non-volatile (such as read-only memory (ROM), flash memory, or other memory). In some examples, the memory 406 may include multiple different types of memory, such as static random access memory (SRAM), dynamic random access memory (DRAM), or ROM.

The memory 406 can store the program instructions as a number of modules that configure processor(s) 408 to perform the various functions described herein, for example operating system 432 for interacting with the computing system 400, as well as the physics simulation engine 205, feedback engine 210, and machine learning system 215, the configurations of which are described in more detail with respect to FIGS. 2A and 2B. The physics simulation engine 205, feedback engine 210, and machine learning system 215 can be in direct communication with one another or distributed among computing devices within a networked computing system and in communication with each other. Components used for the architecture may depend at least in part upon the type of network and/or environment selected.

The processor 408 may include one or more general purpose computers, dedicated microprocessors, graphics processors, or other processing devices capable of communicating electronic information. Examples of the processor 408 include one or more application-specific integrated circuits (ASICs), graphical processing units (GPUs), field programmable gate arrays (FPGAs), graphics processing units (GPUs), digital signal processors (DSPs) and any other suitable specific or general purpose processors. The processor 408 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the robotic control system 220 may also include additional storage 412, which may include removable storage and/or non-removable storage. The additional storage 412 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 406 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The robotic control system 220 may also include input/output (I/O) device(s) and/or ports 414, such as for enabling connection with a keyboard, a mouse, a pen, a voice input device, a touch input device, a display, speakers, a printer, or other I/O device. The robotic control system 220 may also include a user interface 416. The user interface 416 may be utilized by a user to access portions of the interactive computing system 200. In some examples, the user interface 416 may include a graphical user interface, web-based applications, programmatic interfaces such as application programming interfaces (APIs), or other user interface configurations. The user interface 416 can include displays of the feedback provision user interfaces described herein. In some embodiments, the I/O device(s) and/or ports 414 and user interface 416 can be part of a user computing device accessing robotic control system 220 via network 260.

The robotic control system 220 also includes a data store 418. In some examples, the data store 418 may include one or more data stores, databases, data structures, or the like for storing and/or retaining information associated with the computing system 400. Thus, the data store 418 may include data structures, such as simulation data repository 442, task success model data repository 444, robotic control policy data repository 225, and recorded observations data repository 245. The simulation data repository 442 can store data relating to the simulations including models of the robotic system 110, object 105, and environment 240, laws of physics applicable to the operation of the robotic system 110 during the task 100, and also data logging the actual simulated runs of the task 100. The task success model data repository 444 can store a reward function or other function suitable for programmatic evaluation of task performance success. This function can be used to guide selection in evolutionary strategy machine learning approaches or to guide policy updates in reinforcement learning approaches. The robotic control policy data repository 225, and recorded observations data repository 245 are described in more detail with respect to FIGS. 2A and 2B.

The robotic control system 220 can communicate over network 460 with robotic system 110, observation system 235, and any user devices involved in the machine learning processes described herein. In some embodiments, the robotic control system 220 (or a portion thereof, for example including robotic controller 250 programmed with a trained control policy) can be included in the robotic system 110. The network 460 can include any appropriate network, including an intranet, the Internet, a cellular network, a local area network or any other such network or combination thereof. For example, network 460 may be a publicly accessible network of linked networks, possibly operated by various distinct parties, such as the Internet. In other embodiments, the network 460 may include a private network, personal area network, local area network, wide area network, cable network, satellite network, cellular telephone network, etc. or a combination thereof, some or all of which may or may not have access to and/or from the Internet. Other devices may access the network 460 to interact with one or more of robotic system 110, observation system 235, and robotic control system 220, for example user computing devices of users providing input into the machine learning classifier training process.

Training Examples

The inventors of the present disclosure have conducted training of robotic control policies using the presently disclosed techniques. Some of these training sessions are described as examples here for purposes of illustrating the benefits of the presently disclosed techniques. As will be appreciated, these training sessions represent real policy training conducted by the robotic control system 220.

In one example, the inventors taught an industrial robotic arm to flip and land a partially-filled water bottle (e.g., land the bottle upright)—without ever explicitly modeling fluid dynamics in the bottle or idiosyncrasies of the environment dynamics. In the virtual phase 200A, the inventors trained the system in a simulator environment. On average, it took between 15-20 episodes (attempted throws) to learn a bottle flip that lands, using 4 degrees of freedom of control on the simulated robotic arm. One of the main advantages of this approach is that the training efficiency remained strong across a variety of target behaviors (as long as they are within the physical limitations of the robot). For example, the inventors could direct the robot to do short 1 meter flips, long 4 meter flips, or sliding "shuffleboard-type" throws. The inventors were able to train all of these behaviors in a similar 20-episode average duration. It is noteworthy that this training efficiency was similar when the inventors tried experiments on the real robot. When the robot was limited to fewer degrees of freedom, the inventors were able to train a successful bottle flip on a real robot in around 3 minutes wall-clock time. As an extension, the inventors were able to train a flip with a high level of water in the bottle, pour out some of that water (without measuring or inputting this information into the training system), and then fine-tune the control policy to work with the new water level in 3 minutes.

Another development was to try to learn a single robotic control policy that could throw the simulated bottle to many distances between 1 meter and 4 meters—a "generalized" policy. After 400 training episodes (400 episodes at 12 seconds each=1.3 hours of training), the policy was able to throw to desired distances between 1 meter and 4 meters within about +/−0.3 meter deviation (e.g when instructed "throw to 2.7 meters," the robot would throw to somewhere between 2.4 and 3.0 meters). The bottle did not land upright every time—the sample estimate was 60% landing. However, the policy was able to learn underlying structure, and generalize outside its training set. For example, when given negative distances (e.g., an instruction to throw backward) or distances larger than 4 meters, the simulated robot would attempt to throw backwards or longer, respectively.

Third, the inventors were able to take the policy learned in simulation, deploy it on the real robot (without further training), and the robot retained approximate mapping of distances in the real world (but not successful landings). Using the long flip as an example, the inventors then fine-tuned the simulated policy to the real robot with 14 training episodes to land a 3.5 meter flip in the real-world environment.

Below is a more detailed description of the methodology used in these example training sessions. As will be apparent, many of the parameters and other implementation details used by the inventors in these experiments can be varied widely. The overall goal was to develop a method for learning complex robotic control. This overall goal can be broken down into the following sub-goals: (A) strong performance on single robotic tasks; (B) good generalization to new robotic tasks, (C) efficiency with respect to development time, training time, and maximizing reuse (development time—it should not take long to set up the software/algorithms/UI for a new application; training time—the robot should learn new behaviors quickly in terms of wall clock time; training data—the robot should make most efficient use of its training data; maximizing reuse—learning one task should prime the algorithm for learning new tasks, providing a flywheel effect, where overall abilities get better as more skills are learned—i.e., it does not have to learn from scratch every time); (D) ease of use—while the underlying algorithm may be more complicated, it should be easy for people to use and train (without ML/software/hardware knowledge); (E) learning something in simulation should help learning in the real world (ideally, one approach may do all training in simulation, but practically, the goal is to train mostly in an approximate simulation, and then fine-tune quickly in the real world); (G) this does not require a perfect simulated model; and (F) robust to real-world "messiness"—sensor noise, changing calibration, new environments, new robots, changing initial conditions, etc.

The inventors chose to use water bottle flipping as an illustrative example, not as the ultimate goal. This choice adds the following: (a) limited degrees of freedom; (b) does not need continuous/stateful control—the system can issue a command (or set of commands) to the robot without querying the environment with sensors, (c) complicated water bottle physics, (d) fast movement, and (e) it would be hard to manually come up with an accurate and well-shaped reward function.

There are two possible modes of policy learning, "general learning" and "fast interactive ML." The steps of these approaches are summarized first and then described in further detail below, and can be used for the policy training process 300 implemented by the robotic control system 220 described above.

General learning refers to the process for building more complex and robust robotic control policies. In this approach the goal is to not learn too fast, so as to limit overfitting.

Figure 5:
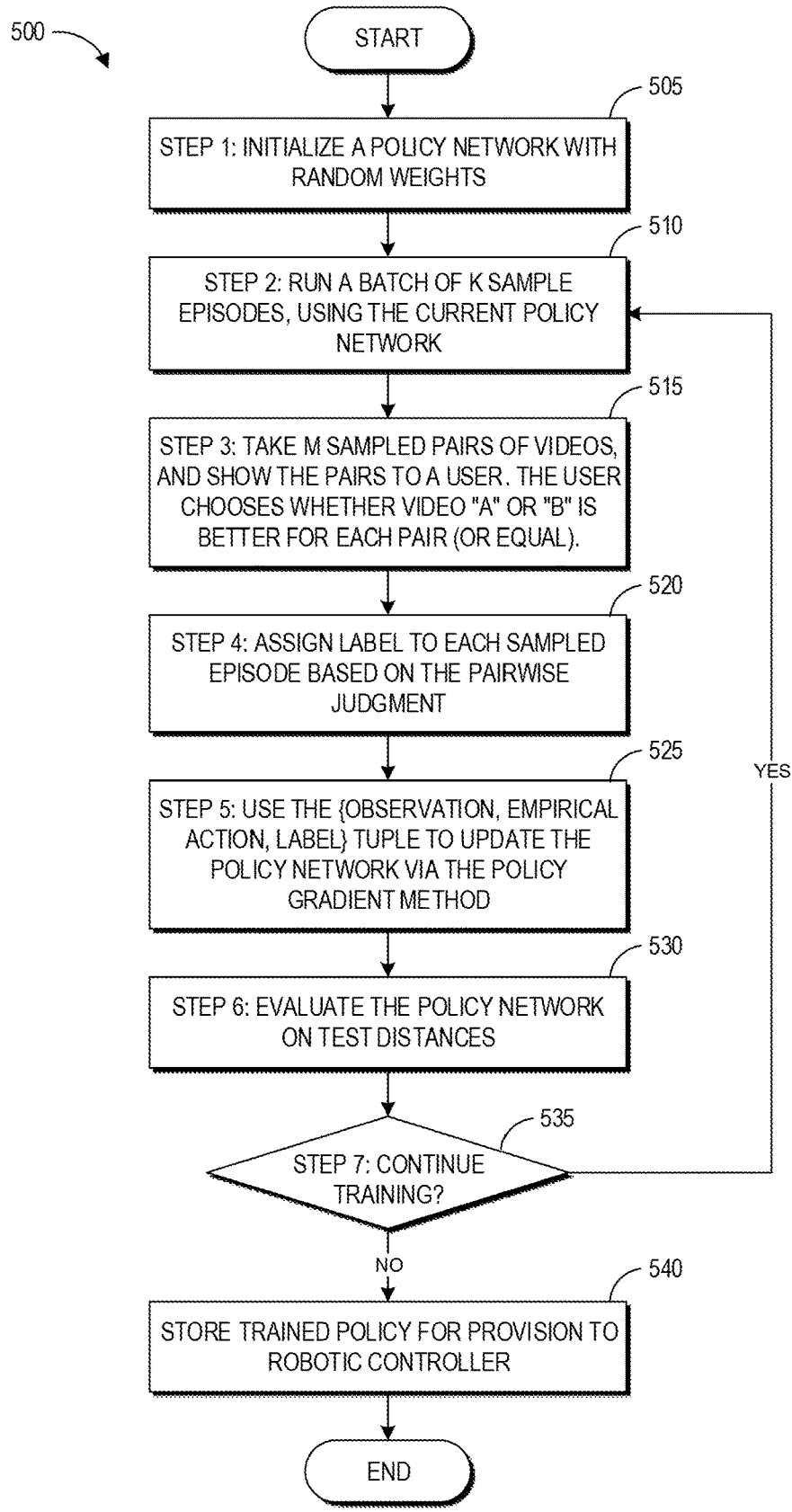
FIG. 5 is a flow diagram of an illustrative artificial intelligence process for training a robotic control policy according to some embodiments.

General learning includes seven steps, as shown by the flowchart of FIG. 5 showing an example process 500 for gradient learning. The process 500 can be used as blocks 301 or 304 of the process 300.

At block 505, the robotic control system 220 performs step 1 of the general learning process 500. The robotic control system 220 initializes a policy network with random weights. The network will take in observation and/or goal vectors, and will output action vectors. With respect to step 1 of general learning, the policy network can be considered as the "workhorse" in the training algorithm, as it determines how the robotic agent will interpret its environment and goals, and produces actions based on that information. The policy can be converted into Gaussian space, and a machine learning network takes the task designation (and optionally system parameters) as inputs and outputs a predicted set of values (the means of Gaussian distribution).

For this use case, the policy network (e.g., a neural network used as the control policy) used a multilayer feedforward neural network (here, with an input layer, one hidden layer, and one output layer), with 16-64 hidden units in each layer. This can be varied in other training situations. The input to the network includes a vector of size 1, with a floating point value representing a target distance between 1 meter and 4 meters. The target distance refers to the distance to which the robot would throw the bottle if performing the task successfully. The network outputs a vector of 4 values, in this example representing three joint angles and a time of release. These output values provide the means of independent Gaussian distributions. The reason for the distribution (instead of directly using these action values) is to (a) provide a method for exploration and (b) it is important for the policy gradient approach in continuous domains (as will be discussed later). This example uses an external decay factor on the standard deviations. The means and standard deviations provide the pre-requisites for sampling actions.

At block 510, the robotic control system 220 performs step 2 of the general learning process 500. The robotic control system 220 runs a batch of k sample episodes (e.g., virtual or real trials), using the current policy network. With respect to step 2, this uses a "forward pass" through the policy network by which the robotic control system 220 tries a variety of actions in the simulated and/or real world environments. No learning updates happen at this stage as it functions simply for collecting training data. The training can uniformly randomly sample (e.g., k=20) target distances between 1 meter and 4 meters. For each of these sampled target distances, the system 220 obtains a sample action vector as described in step 1, and then sends the translated command to the robot. The robot (simulated or real) will run an episode, and the robotic control system 220 will collect data for later use. Specifically, the robotic control system 220 records: observation-vector (in this case, the target distance), action-vector (these are the sampled actions, not the mean action), environment—diagnostic environment name, and MP4 file—video recording of the episode.

At block 515, the robotic control system 220 performs step 3 of the general learning process 500. The robotic control system 220 takes m sampled pairs of videos and shows the pairs to a user (or presents them to a trained machine learning evaluator). The user chooses whether video "A" or "B" is better for each pair (or whether the two are equal). The human-provided pairwise judgments help in multiple ways. For example, it may be difficult to specify good behavior, but it is easier to recognize good behavior. In addition, giving a pairwise judgment can be easier than giving an absolute value judgment. Further, quality judgments give a better-shaped reward signal, compared to a sparse reward signal with little gradient. In some embodiments, the human-provided judgments may be supplemented or replaced by an automated machine learning evaluation of task performance.

For this feedback step, the robotic control system 220 can choose the pairs (video A and video B) using k-nearest neighbors algorithm ("k-NN") in the observation space. The robotic control system 220 can sample the A option uniformly at random from the current batch. Once robotic control system 220 identifies the A sample, it can perform a k-NN search between the A observation and all other observations, and sample randomly from that top K. The resulting episode will be the B video. To illustrate, if video A relates to a target distance=1.7 m, then the potential second videos in the pair would relate to target distances around 1.5 m to 2.0 m. This can be repeated for m pairs to collect a number of data records of 5-tuples: {observation A, action A, observation B, action B, pairwise label}.

The rationale for this sampling is that it can be easier to compare two episodes when the two episodes look similar, and with the vector-represented observations this similarity can be evaluated by the robotic control system 220 as vector similarity. For example, as described above, the network outputs a vector of 4 values, in this example representing three joint angles and a time of release. The robotic control system 220 can compare these vectors to determine the difference in joint positions and release time between observation A and observation B, generating a "change vector" with four values that represent the magnitude of the difference between the values of the vector of observation A and the corresponding values of the vector of observation B. The robotic control system 220 can assign a positive reward to the higher-performing observation, generate an update vector using reinforcement learning, and then update the network parameters via a gradient update by weighting the update vector with the change vector. This approach enables the robotic control system 220 to identify where and by how much policy A differed from policy B, and then leverage the feedback saying that policy A caused better performance in order to weight the updates to these areas more heavily. Where policy A and policy B were the same, no update may be applied. This approach logically presumes that the differences between policy A and policy B account for the superior performance of policy A, and so rewards these differences with more heavily weighted updates. This can increase the likelihood that actions that yielded positive rewards will continue to occur. Some embodiments can also assign negative rewards to the policy that was not favored.

In addition, some embodiments can look at one sigma and six sigma values relating to the policy performance in order to weight the updates. For example, the robotic control system 220 can analyze the mean and variance of performance based on values of the policy network output nodes for the trials.

The robotic control system 220 is trying to learn one general policy, but that policy could include different actions under different observations. It would be undesirable to conflate the differences between observations with the difference between policy qualities. For example, if two observations are very different, then that signal could confound the view of the policy.

Consider the following example: In a hypothetical pair, the A target is 1.3 m, and the B target is 3.7 m. Both videos look "okay"—neither is great, neither is terrible with respect to their individual goal distances. If the user tried to say whether A or B was better, the user could implicitly let the target distances impact the quality judgments of the two episodes—maybe throwing longer is implicitly a harder goal. Thus, episode B could "look worse" than A, even if the policy is actually better relative to how close A is to optimal for its own distance. Now, the target distance is a simple example—it is one number. By framing this as a vector similarity problem, it generalizes to images, sounds, and data from sensors—anything for which the robotic control system 220 can learn representations.

At block 520, the robotic control system 220 performs step 4 of the general learning process 500. The robotic control system 220 assigns a label to each sampled episode based on the pairwise judgment provided at block 515. As described above, the pairwise label is an AB choice. To translate this to a numerical value that is usable in the machine learning model, one example could say +1 for the positive episode, and 0 for the negative episode. However, to account for some level of uncertainty in this subjective judgment, the distribution can be softened a little bit—for example the positive episode gets (1-epsilon) reward, and the negative episode gets (epsilon) reward. Each labeled observation can be stored as a 3-tuple in the form {observation, empirical action, label}.

At block 525, the robotic control system 220 performs step 5 of the general learning process 500. The robotic control system 220 uses the {observation, empirical action, label} tuple to update the policy network via the policy gradient method. This is the learning step, the "backward pass" through the policy network to refine its parameters. The policy gradient method operates under the following principle: make good actions more probable and bad actions less probable. More precisely, the robotic control system 220 will adjust policy network parameters such that actions with high empirical returns have higher probability, and actions with low empirical returns have lower probability. Step 5 can be performed according to the update equation of the policy gradient of the machine learning system 215. This equation tells the robotic control system 220 what direction to move (the gradient) to increase expected rewards. In simplest terms, the robotic control system 220 can plug in our data from steps 3 and 4 into this equation, get some list of values, and then add those values to the neural network parameters—this how it performs machine learning. Other examples make certain adjustments to this equation to improve learning performance.

Although the present disclosure discusses policy updates via reinforcement learning, this example can be considered more like contextual bandits because there is no closed feedback loop. However, the algorithm used extends to the reinforcement learning domain naturally. The code can be written in a way that expects stateful control, and just happens to have one state per episode.

At block 530, the robotic control system 220 performs step 6 of the general learning process 500. The robotic control system 220 evaluates the policy network on test distances. The training policy includes a lot of noise around the action means. For evaluation, the robotic control system 220 looks at the center of the policy where there is little-to-no noise. One reason for this is to monitor how the policy is generally shifting. Steps 2-6 can involve saving data, model checkpoints, and diagnostic metrics throughout training.

At decision block 535, the robotic control system 220 determines whether to perform step 7 of the general learning process 500. Step 7 involves repeating steps 2-6. Repeating steps 2-6 can optionally involve decaying things like the learning rate, noise standard deviation, etc. To make this determination, the robotic control system 220 determines whether to continue training the policy, for example by comparing current and/or past results using the policy to a success metric as described with respect to FIG. 3. If the robotic control system 220 determines to perform step 7, the process 500 loops back to block 510 to repeat steps 2-6. If not, the process transitions to block 540 to store the trained policy for provision to a robotic controller.

Fast interactive machine learning ("ML") refers to a simplified version done, for example, for real-time demos—it is more akin to parameter search and calibration, and the goal is to learn fast. Fast interactive ML also includes seven steps, though some steps differ from the steps of general learning as described below.

At step 1 of fast interactive ML process, the robotic control system 220 initializes a policy network with random weights (or pre-learned weights). This can be similar to block 505 described above.

At step 2 of fast interactive ML process, the robotic control system 220 takes one sample action from the current policy network, and sets it as option A. This is an adaptation from general learning step 2 (block 515 of the process 500), but uses just one sample—the fast interactive ML process is trying to be as data-efficient as possible and is typically not used for training complex policies, so there might just be a dummy observation. The "A" option will be the "anchor" or "best-yet" option.

At step 3 of fast interactive ML process, the robotic control system 220 takes one sample action from the current policy network, and sets it as option B. This is an adaptation from general learning step 2, but uses just one sample as the "new" or "exploration" option.

At step 4 of fast interactive ML process, the robotic control system 220 compares whether episode A or B was better. This can be performed similarly to block 520 of the process 500 to elicit a pairwise judgement from a user or trained machine learning classifier.

At step 5 of fast interactive ML process, the robotic control system 220 assigns a label to each episode based on the pairwise judgment. This can be performed similarly to block 515 of the process 500.

At step 6 of fast interactive ML process, the robotic control system 220 updates the policy network using the label and policy gradient method. This can be performed similarly to block 525 of the process 500.

At step 7 of fast interactive ML process, the robotic control system 220 stores the best-yet episode as the new option A. The robotic control system 220 will overwrite option A if the new episode is better than the old anchor episode. Thus, with fast interactive ML the robotic control system 220 is always comparing to the "best-yet" observation. This also can cut down the training episodes (in some cases, it cuts them in half), as the robotic control system 220 does not need a fresh A and B, but only need a fresh B option.

At step 8 of fast interactive ML process, the robotic control system 220 repeats steps 3-7. This can continue the training process until the operators are satisfied with performance of the robotic control policy. Some implementations of fast interactive ML can cut out the model saving, logs, and plotting to make it as fast as possible.

Some embodiments can implement a two-network system—a policy network and a reward network. The reward network would learn how to "score" an (observation, action) pair, and the training data for this scoring would be human judgments. The human judgments could be pairwise comparisons, where the robotic control system 220 learns a continuous function that tries preserve ranking seen in the training examples. Benefits of having the second network to model the reward include that it may be easier to learn in value/reward space than in policy space, it allows options besides AB pairwise signals to provide rewards back to the policy network, it opens the door to automating the reward evaluation (e.g. training a computer vision system to automatically evaluate results), and it may be possible to use the same reward network as a signal for different policies. Potential disadvantages of having the second network to model the reward include that it can be harder to normalize (e.g., the policy network learns better if the reward signals are normalized to mean 0 and unit standard deviation), can yield the "moving target" effect from having both the reward network and policy network being updated (thus reducing system stability through an additional layer of variance) and so sampling strategies become even more important, and that the reward network is explicitly higher dimension than the policy network (e.g., the reward network's domain is observations X actions, but the policy network's domain is actions). Another potential drawback is that the dual-network system can have a long "warm-up" period because in the beginning, the robotic control system 220 starts from scratch with two networks instead of one, and it can be fruitless to send reward network signals to the policy network if the reward network is bad. Therefore, the system can require a significant quantity of training data at the beginning to prime the reward network.

Thus, in some implementations, the efficiency and fewer moving parts can lead to choosing the one-network approach. In the long term, or for more complex problems, it may makes sense to try the two-network approach. As another alternative approach, the robotic control system 220 can try a purely reward/value-based approach where it only models the reward network (or a Q network if using states and actions)/

Terminology

Implementations disclosed herein provide systems, methods and apparatus for training and using machine learning models. The disclosed training and prediction models can be implemented in machine learning systems or artificial intelligence systems, including robotic systems performing specific tasks. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a graphics processing unit (GPU), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a robotic system that performs a task according to a robotic controller programmed to implement a set of control policies, wherein a first control policy of the set of control policies controls the robotic system to perform a first portion of the task and a second control policy of the set of control policies controls the robotic system to perform a second portion of the task that occurs after the first portion; and
one or more processors programmed with executable instructions to at least:
implement a physics simulation engine that runs a simulated environment that simulates a real world environment of the robotic system performing the task;
run first trials of the robotic system performing the first portion of the task in the simulated environment and in the real world environment;
use machine learning to train the first control policy based on evaluations of a level of success at the first portion of the task represented by the first trials;
run second trials of the robotic system performing the second portion of the task in the simulated environment and in the real world environment, wherein the trained first control policy controls the robotic system to perform the first portion of the task during the second trials; and
use machine learning to train the second control policy based on evaluations of a level of success at the second portion of the task represented by the second trials,
wherein the robotic controller controls the robotic system to complete performance of the task using the set of control policies including the trained first and second policies.

2. The system of claim 1, wherein the executable instructions program the one or more processors to:
learn a preliminary version of the first control policy based on evaluations of simulations of the first portion of the task run in the simulated environment; and
refine the preliminary version of the first control policy based on evaluations of trials of the first portion of the task run in the real world environment.

3. The system of claim 2, wherein the executable instructions program the one or more processors to learn a preliminary version of the second control policy based on evaluations of additional simulations run in the simulated environment, wherein the additional simulations simulate the robotic system performing the first portion of the task based on the first control policy.

4. The system of claim 3, wherein the executable instructions program the one or more processors to refine the preliminary version of the second control policy based on evaluations of additional trials run in the real world environment, and wherein, for the additional trials, the robotic controller operates the robotic system to perform the first portion of the task based on the first control policy.

5. The system of claim 2, wherein the executable instructions program the one or more processors to determine to:
determine to revise parameters of the simulated environment based on a result of the evaluation of the trials of the first portion of the task run in the real world environment;
run additional simulations of the first portion of the task in the simulated environment having the parameters revised; and
re-learn the preliminary version of the first control policy based on evaluations of the additional simulations.

6. The system of claim 1, wherein the executable instructions program the one or more processors to determine to train the first control policy before the second control policy based on data representing sequential actions of the task.

7. The system of claim 6, wherein the data indicates that the first portion of the task involves a first action and the second portion of the task involves a second action, and wherein the first action occurs before the second action in the sequential actions of the task.

8. A computer-implemented method comprising, as performed by at least one computing device configured to execute specific instructions:
generating a simulated environment that corresponds to a real world environment of a robotic system performing a task according to a robotic controller programmed to implement a set of control policies, wherein a first control policy of the set of control policies controls the robotic system to perform a first portion of the task and a second control policy of the set of control policies controls the robotic system to perform a second portion of the task;

running first trials of the robotic system performing the first portion of the task in the simulated environment and in the real world environment;

using machine learning to train the first control policy based on evaluations of a level of success at the first portion of the task represented by the first trials;

running second trials of the robotic system performing the second portion of the task in the simulated environment and in the real world environment, wherein the second trials include performing the first portion of the task based on the trained first control policy;

using machine learning to train the second control policy based on evaluations of a level of success at the second portion of the task represented by the second trials; and using the robotic controller to control the robotic system to complete performance of the task based on the trained first and second policies.

9. The method of claim 8, further comprising:

learning a preliminary version of the first control policy based on evaluations of simulations of the first portion of the task run in the simulated environment; and refining the preliminary version of the first control policy based on evaluations of trials of the first portion of the task run in the real world environment.

10. The method of claim 9, further comprising learning a preliminary version of the second control policy based on evaluations of additional simulations run in the simulated environment, wherein the additional simulations simulate the robotic system performing the first portion of the task based on the first control policy.

11. The method of claim 10, further comprising refining the preliminary version of the second control policy based on evaluations of additional trials run in the real world environment, wherein, for the additional trials, the robotic controller operates the robotic system to perform the first portion of the task based on the first control policy.

12. The method of claim 9, further comprising:

determining to revise parameters of the simulated environment based on a result of the evaluation of the trials of the first portion of the task run in the real world environment;

running additional simulations of the first portion of the task in the simulated environment having the parameters revised; and re-learning the preliminary version of the first control policy based on evaluations of the additional simulations.

13. The method of claim 8, further comprising determining to train the first control policy before the second control policy based on data representing sequential actions of the task.

14. The method of claim 13, wherein the data indicates that the first portion of the task involves a first action and the second portion of the task involves a second action, the method further comprising identifying from the data that the first action occurs before the second action in the sequential actions of the task.

15. A non-transitory computer storage medium storing executable code, wherein the executable code configures a computing system to perform a process comprising:

generating a simulated environment that corresponds to a real world environment of a robotic system performing a task according to a robotic controller programmed to implement a first control policy that controls the robotic system to perform a first portion of the task and a second control policy that controls the robotic system to perform a second portion of the task;

running first trials of the robotic system performing the first portion of the task in the simulated environment and in the real world environment;

using machine learning to train the first control policy based on evaluations of a level of success at the first portion of the task represented by the first trials;

running second trials of the robotic system performing the second portion of the task in the simulated environment and in the real world environment, wherein performing the second portion of the task includes performing the first portion of the task based on the trained first control policy;

using machine learning to train the second control policy based on evaluations of a level of success at the second portion of the task represented by the second trials; and using the robotic controller to control the robotic system to complete performance of the task based on at least the first and second control policies.

16. The non-transitory computer-readable medium of claim 15, the process further comprising:

learning a preliminary version of the first control policy based on evaluations of simulations of the first portion of the task run in the simulated environment; and refining the preliminary version of the first control policy based on evaluations of trials of the first portion of the task run in the real world environment.

17. The non-transitory computer-readable medium of claim 16, the process further comprising learning a preliminary version of the second control policy based on evaluations of additional simulations run in the simulated environment, wherein the additional simulations simulate the robotic system performing the first portion of the task based on the first control policy.

18. The non-transitory computer-readable medium of claim 17, the process further comprising refining the preliminary version of the second control policy based on evaluations of additional trials run in the real world environment, wherein, for the additional trials, the robotic controller operates the robotic system to perform the first portion of the task based on the first control policy.

19. The non-transitory computer-readable medium of claim 16, the process further comprising:

determining to revise parameters of the simulated environment based on a result of the evaluation of the trials of the first portion of the task run in the real world environment; and re-learning the preliminary version of the first control policy based on evaluations of the additional simulations of the first portion of the task run in the simulated environment having the parameters revised.

20. The non-transitory computer-readable medium of claim 15, the process further comprising determining to train the first control policy before the second control policy based on data representing sequential actions of the task.

\* \* \* \* \*